(12) United States Patent
Fox et al.

(10) Patent No.: US 8,940,188 B2
(45) Date of Patent: Jan. 27, 2015

(54) CARBON ABSORBING SYSTEM USED IN THE PRODUCTION OF SYNTHESIS GAS

(75) Inventors: James Alistair Fox, Johannesburg (ZA); Diane Hildebrandt, Johannesburg (ZA); David Glasser, Johannesburg (ZA); Bilal Patel, Johannesburg (ZA); Brendon Hausberger, Johannesburg (ZA); Baraka Celestin Sempuga, Johannesburg (ZA)

(73) Assignee: University of the Witwartersrand Johannesburg, Johannesburg (ZA)

( * ) Notice: Subject to any disclaimer, the term of this patent is extended or adjusted under 35 U.S.C. 154(b) by 0 days.

(21) Appl. No.: 13/322,774

(22) PCT Filed: May 26, 2010

(86) PCT No.: PCT/IB2010/052339
§ 371 (c)(1),
(2), (4) Date: Jun. 13, 2012

(87) PCT Pub. No.: WO2010/136980
PCT Pub. Date: Dec. 2, 2010

(65) Prior Publication Data
US 2012/0241675 A1   Sep. 27, 2012

(30) Foreign Application Priority Data

May 26, 2009   (ZA) .................................. 2009/03621

(51) Int. Cl.
*B01J 10/00*   (2006.01)
*C01B 3/34*   (2006.01)
(Continued)

(52) U.S. Cl.
CPC . *C01B 3/34* (2013.01); *C01B 3/382* (2013.01); *C01B 3/48* (2013.01); *C01B 3/50* (2013.01); *C01B 2203/0233* (2013.01); *C01B 2203/0244* (2013.01); *C01B 2203/0283* (2013.01); *C01B 2203/0415* (2013.01); *C01B 2203/0475* (2013.01); *C01B 2203/0495* (2013.01); *C01B 2203/06* (2013.01); *C01B 2203/0811* (2013.01); *C01B 2203/0827* (2013.01);
(Continued)

(58) Field of Classification Search
None
See application file for complete search history.

(56) References Cited

U.S. PATENT DOCUMENTS 2,486,895 A * 11/1949 Watson ........................ 518/711
5,714,657 A *  2/1998 deVries ........................ 585/310
(Continued)

FOREIGN PATENT DOCUMENTS

| GB | 2 168 718 | 6/1986 | ................ C01B 3/22 |
| WO | 95/24367 | 9/1995 | ................ C07C 1/02 |

(Continued)

OTHER PUBLICATIONS

Search Report of the International Search Authority, PCT/IB2010/052339, date of mailing Aug. 26, 2010, 5 pages.
(Continued)

*Primary Examiner* — Melvin C Mayes
*Assistant Examiner* — Douglas Call
(74) *Attorney, Agent, or Firm* — Nixon Peabody LLP

(57) ABSTRACT

A system for the production of synthesis gas and, for the production thereof, where the system is preferably a net carbon dioxide absorber. The invention covers both the methodology for the development of the process and the system for the implementation of the process, inclusive of the required utility systems.

4 Claims, 7 Drawing Sheets

(51) Int. Cl.
*C01B 3/38* (2006.01)
*C01B 3/48* (2006.01)
*C01B 3/50* (2006.01)

(52) U.S. Cl.
CPC .. *C01B 2203/1241* (2013.01); *C01B 2203/148* (2013.01); *C01B 2203/84* (2013.01)
USPC .......................................... 252/373; 422/162

(56) References Cited

U.S. PATENT DOCUMENTS

| | | | |
|---|---|---|---|
| 2001/0009653 A1* | 7/2001 | Clawson et al. | 423/437.1 |
| 2009/0012188 A1 | 1/2009 | Rojey et al. | 518/700 |
| 2009/0117024 A1 | 5/2009 | Weedon et al. | |
| 2009/0230359 A1* | 9/2009 | Guvelioglu et al. | 252/373 |
| 2009/0232729 A1* | 9/2009 | Genkin et al. | 423/651 |

FOREIGN PATENT DOCUMENTS

| | | | |
|---|---|---|---|
| WO | 00/03126 | 1/2000 | F01K 23/10 |
| WO | 2009/000494 | 12/2008 | B01J 21/04 |

OTHER PUBLICATIONS

Written Opinion of the International Search Authority, PCT/IB2010/052339, date of mailing Aug. 26, 2010, 8 pages.

* cited by examiner

CARBON ABSORBING SYSTEM USED IN THE PRODUCTION OF SYNTHESIS GAS

CROSS REFERENCE TO RELATED APPLICATIONS

This application is a U.S. National stage of International Application No. PCT/IB2010/052339, filed May 26, 2010, which is related to and claims priority to South African Patent Application No. 2009/03621, filed May 26, 2009, which is incorporated entirely herein by reference.

FIELD OF THE INVENTION

This invention relates to a system for the production of synthesis gas and, for the production thereof, preferably the system is a net carbon dioxide absorber and the invention is intended also to cover both the methodology for the development of the process and the system for the implementation of the process, inclusive of the required utility systems.

INTRODUCTION TO THE INVENTION

"Synthesis Gas", or "Syngas", is a mixture of carbon monoxide (CO), hydrogen ($H_2$) and Carbon Dioxide ($CO_2$) with other components present in much lesser quantities, typically when produced with a molar ratio $CO:H_2$ of between 1:3 and 1:0.7.

Currently synthesis gas is made by one of two processes, either from coal by gasification with oxygen, usually extracted from air and water, or from methane by reforming with oxygen or water. Reforming is a process by which light hydrocarbons, such as methane and/or propane etc, are formed into a gaseous mixture of carbon monoxide, carbon dioxide and hydrogen. Typical reformers emit some carbon dioxide and heat is released by generating high temperature steam. According to The New York State Energy and Research Development Authority, the efficiency of industrial reformers is estimated to be between 65-75%.

In applying the steam reforming process to methane, synthesis gas can be produced by the following reaction:

$$CH_4 + H_2O \rightarrow CO + 3H_2$$

The $CO:H_2$ ratio produced in this way may not be optimal for use in downstream synthesis processes and a Water Gas Shift (WGS) reaction as described below can be used to adjust the $CO:H_2$ ratio.

$$CO + H_2O \leftrightarrow CO_2 + H_2$$

This adjustment results in the creation and subsequent emission of carbon dioxide or water at some point in the process depending on the required adjustment.

The steam reforming synthesis gas production processes are endothermic and, as a consequence, a considerable amount of energy is required to run these processes. In addition there are also significant carbon dioxide emissions which are a cause for concern as it is a harmful greenhouse gas.

This patent specification describes a production system for the production of synthesis gas where such system has the benefits of being highly carbon efficient (resulting in an increased conversion of carbon in the feedstock to usable carbon in the synthesis gas) and, in some instance a net carbon dioxide absorber, while simultaneously being a net work generating system.

The inventors, in designing such system, made use of an alternative method of design, compared to that of sequential design methods. This new method made use of the properties of Enthalpy and Gibbs Free-Energy to take a graphical approach in analysing the interactions between various process units at the earliest stages of design. This approach allows the selection of operating temperatures and pressures to create flow sheets that are as efficient as possible. This technique comprises the following general steps which are explained in greater detail below and then applied to a gas reformation process to design the system that forms the subject of this invention:

1.1. Definition of a simple system;
1.2. Calculating the heat and work required by the system;
1.3. Representing the required heat and work graphically on a change of Enthalpy versus change in Gibbs Free-Energy graph;

1.1. Defining a Simple Process

A simple system is defined to be a system where the feeds enter and products leave the system at ambient conditions. Further there is one place in the system operating at temperature T that allows the addition of heat to the system. This is shown in FIG. 1.

If an Energy Balance is performed on the Simple Process the change in Enthalpy can be calculated by:

$$\Delta H^0_{reaction} = \left( \sum_i v_i \Delta H^0_{f,i} \right)_{products} - \left( \sum_i v_i \Delta H^0_{f,i} \right)_{reactants} \quad (1)$$

Where:
$u_i$ (Symbol Upsilon) is the stoichiometric coefficient in the component i.
The subscript f represents "of formation"
The superscript 0 represents standard conditions.
The subscript i represents species i This is to say that $\Delta H$ for the simple system is given by the difference of the Enthalpies of Formation of the products and feeds. This is because the products and feeds both enter and leave at ambient conditions, which removes the Enthalpy change due to Heat Capacity.

Similarly it is possible to calculate $\Delta G$, which represents the work, of the Simple system by:

$$\Delta G^0_{reaction} = \left( \sum_i v_i \Delta G^0_{f,i} \right)_{products} - \left( \sum_i v_i \Delta G^0_{f,i} \right)_{reactants} \quad (2)$$

In the case where the system requires work and heat (positive values, from Equation 1 and 2), the system would require a minimum of that amount of heat and work to be feasible. If the values were negative, the system would be feasible, the values calculated by Equations 1 and 2 would then represent the amount of heat and work that would need to be recovered for the system to be reversible. If the heat or work from such a system were not recovered all the potential would be lost and lead to inefficiencies.

1.2. Calculating the Heat and Work Required by the System

Now that the minimum requirements for a Simple Process have been defined one needs to determine how these requirements are met. The addition of heat is self explanatory in that heat is transferred along temperature gradients and is well understood whereas the addition of work is somewhat more complex.

The thermodynamic definition of $\Delta G$, or the work, is given by equation 3 below:

$$\Delta G_{reaction}^0 = -TdS + VdP + \Sigma \mu dN \quad (3)$$

Where:
$u_i$ (Symbol Mew) is the chemical potential;
dN is the change in the number of moles;
T is the Temperature;
dS is the change in Entropy;
V is Volume; and
dP is the change in Pressure.

Equation 3 shows that there are three ways to add work to a system. They are using heat (TdS term), pressure (VdP term) and separation (udN term)

In chemical processes work requirements can be quite large and the bulk of the work is transferred with heat. Processes need/reject heat; it is advantageous to use this heat for work supply/recovery at the same time.

The amount of work carried with the heat is given by the well known Carnot Equation for heat engines.

$$W = \Delta H \left(1 - \frac{T_o}{T}\right) \quad (4)$$

Where:
W is the Carnot work;
$\Delta H$ is the heat of the process;
$T_o$ is the ambient temperature; and
T is the temperature that the heat is supplied at.

The ideal situation would be if all the work was carried with the heat. This would mean the other two methods of work addition would not be required. If all the work were carried in by the heat it would imply that the work from Equation 4 would be exactly equal to the $\Delta G$ of the simple system calculated by Equation 2. This will happen only at the so-called Carnot Temperature. This being the temperature at which all the work required/rejected by the system will be carried with the heat of the system. It would be the ideal operating temperature for the Simple Process.

Often these temperatures prove to be unworkable. When the $\Delta H$ and $\Delta G$ of a system are very close together the Carnot Temperature will approach infinity, or when $\Delta G$ is greater than $\Delta H$ the Carnot Temperature will be below the absolute zero. This means that often other temperatures must be used; resulting is deficiencies or excesses in the work requirements of the system. For such cases the system will have to be designed to take such deficiencies/excesses into account.

This can be done by recalling that there remain two additional methods for work addition/recovery.

Returning to Equation 3 it would be possible to consider work addition by compression. To solve the integral, assume an isothermal compression of an ideal gas. This gives:

$$\Delta G_{compression} = nRT\ln\left(\frac{P}{P^0}\right) \quad (5)$$

Where:
n is the moles of gas
R is the universal gas constant
T is the compression temperature
P and $P^0$ are the final and initial pressures respectively Equation 5 quantifies the amount of work that must be done on a gas stream to increase its pressure. It is important not to forget the definition of the Simple Process. The products must leave the system at ambient pressure. So it would be possible to apply equation 5 to both the feed and product streams, remembering the product stream is being decompressed.

Then the net work requirement for the Simple Process could be calculated. This will give rise to:

$$\Delta G_{compression} = (n_{in} - n_{out})RT\ln\left(\frac{P}{P^0}\right) \quad (6)$$

Where:
n is the moles of gas entering or leaving the system
R is the universal gas constant
T is the compression temperature
P and $P^0$ are the final and initial pressures respectively Equation 6 shows an important result: It is only possible to add work to a system, using compression, when there is more gas moles entering the system then there are leaving it. If the number of moles does not change, pressure does not add any work to the system and if there are more moles leaving then entering, work can be recovered from the system.

The third method of adding work to a system is via separation. Once again, assume that the system behaves ideally. The $\Delta G$ for separations will then be given by Equation 7:

$$\Delta G_{mix} = RT\left(\sum_i x_i \ln x_i\right) \quad (7)$$

Where:
R is the universal gas constant
T is the mixing Temperature
x is the liquid mole fraction of component i Care should be taken to ensure that Equation 7 is assigned the appropriate sign to indicate the direction of work flow. In this case, a positive value indicates work addition which indicates a separation. A negative sign would be assigned to a mixing process.

In the above it has been assumed that pressure is changed isothermally and that all the components in the system are ideal.

1.3. Graphical Representation

By applying the above method, the quantities of heat and work can be determined and can be represented graphically.

$\Delta H$ and $\Delta G$ can be drawn onto a plot and the position of the point could be used to describe the nature of the system the point represented. The plot of $\Delta H$ against $\Delta G$ provides a simple link between the thermodynamics and the reality, $\Delta H$ is equal to the heat and $\Delta G$ is equal to the work.

In considering the combustion of methane, as would occur in a conventional steam reformation process, the following reaction occurs:

$$CH_4(g) + 2O_2(g) \rightarrow CO_2(g) + 2H_2O(g)$$

When equations 1 and 2 are used on this reaction, it is found that the reaction is exothermic and work producing. Having calculated $\Delta H = -802.35$ kJ/mol and $\Delta G = -800.71$ kJ/mol, they can be drawn on the graph shown in FIG. 2

FIG. 2 shows the methane combustion reaction drawn onto the plot of $\Delta H$ and $\Delta G$.

If the quantity of both reactants is decreased by 50% and 20% respectively, applying equations 1 and 2 could be used again and the $\Delta H$ and $\Delta G$ recalculated and the new values drawn onto the Figure as shown in FIG. 3.

FIG. 3 shows a plot showing the effect of the extent of the reaction for a methane combustion reaction. FIG. 3 shows the calculated values of $\Delta H$ and $\Delta G$ calculated for differing quantities of reactants. Namely the 100%, 50% and 20% amounts. This is analogous to Extent of Reaction, or how far to completion a reaction proceeds. It can be seen that not allowing a reaction to proceed to completion decreases the heat and work calculated from equation 1 and 2, and it does so in a linear fashion.

The combustion reaction could thus be drawn as a line from the origin to its highest extent, which would represent all the possible extents of reaction. This means that all reactions can be represented as lines on the Figure. Note that it is possible to have an extent of more than 100% by adding greater amounts of feed rather than less. All the extents of the reaction up to 100% for the combustion of methane is shown as a plot as is seen in FIG. 4:

The line drawn in FIG. 4 represents the combustion reaction occurring at a particular temperature. When $\Delta H$ and $\Delta G$ are calculated from equations 1 and 2 the temperature of the reaction line is the Carnot Temperature as calculated by equation 4.

Using equation 4, the Carnot Temperature can be calculated to be in the region of 14500K. It is clear that some modification needs to be performed on the calculation of the reaction lines that allows for temperatures other then the Carnot Temperature to be used.

Remembering that the requirement of a Simple Process must be satisfied, the $\Delta H$ of a reaction can be calculated at any temperature by equation 1. In other words, as long as a system is a simple one, $\Delta H$ is not affected by temperature. $\Delta G$ for the reaction, at any temperature, can now be calculated from Equation 4, recalling that $W=\Delta G$.

This means that changing the temperature of a reaction will change the slope of the reaction line on the $\Delta H-\Delta G$ plot at constant Enthalpy. FIG. 5 shows the effect of temperature on the plot of $\Delta H$ and $\Delta G$ for a methane combustion reaction.

FIG. 5 shows the Combustion reaction, at its Carnot Temperature, as the dotted line. The solid line shows the Combustion reaction at 1500K and the dashed line shows combustion at 900K. The reaction line has shifted upwards, at constant enthalpy, along the dashed arrows as a result of the new $\Delta G$ calculated at 1500K and 900K using equation 4.

If one now considers the hypothetical case of combusting methane to form carbon dioxide and water vapor and the resultant water vapor then being condensed to liquid phase, the flow sheet of this hypothetical system might look like FIG. 6.

The $\Delta H$ and $\Delta G$ for the system of FIG. 6 could be calculated in 2 ways. Equations 1 and 2 (or Equations 1 and 4, if non-Carnot temperatures are desired) could be used on the Combust and Phase Change boxes independently and their results added. Alternatively the equations could be applied to the system as a whole, using the overall feeds and products.

What this shows is that the overall $\Delta H$ and $\Delta G$ for a system is the sum of its individual units. This is not a new result by any means. It is well applied in system energy and work balances.

However, it does show that reactions have length, defined by extent of reaction. They also have direction, defined by temperature and they can be added to together. This means that reactions are not just lines on the $\Delta H-\Delta G$ plot, they are vectors.

Using the fact that the heat and work for the overall system is the sum of the heat and work of the units in the system it is possible to state that not only are reactions vectors on the $\Delta H-\Delta G$ but so is any other process unit.

This is to say that any unit process, for which $\Delta H$ and $\Delta G$ can be defined, can be represented as a vector on the $\Delta H-\Delta G$ plot.

In the case of gas reformation, there are 3 unit processes. Namely: Reactor, Compressor/Turbine and Separator.

Since the compressors are considered to be isothermal and the separators are considered to be ideal they have no $\Delta H$ and are thus vertical lines on the $\Delta H-\Delta G$ plot. If the $\Delta H$ can be calculated for compression and mixing, that component of the compressor and mixing vectors can be taken into account, although this has not been considered in designing a system according to this patent.

In applying the abovementioned technique, a system for the production of synthesis gas was designed wherein the net result of the system is a carbon dioxide efficient system, preferably a carbon dioxide absorber, and one which is a net work generator.

As is commonly known, carbon dioxide is a harmful greenhouse gas. With the implementation of carbon taxes and capping of carbon dioxide emissions, it is in the interest of industry to reduce the amount of carbon dioxide emitted from both an environmental point of view and an economic one. Furthermore, current systems used to produce synthesis gas do not harness energy created in the process and, more often than not, this additional energy is allowed to escape into the atmosphere through the release of heat.

It would therefore be beneficial if a system for the production of synthesis gas could be created that would at least in part help to alleviate some of the problems identified above.

SUMMARY OF THE INVENTION

In accordance with this invention there is provided a carbon efficient synthesis gas production system comprising:
- a hydrocarbon gas source to provide a first hydrocarbon gas;
- a phase change reactor to convert liquid water into gaseous water;
- a combustion chamber to combust a second hydrocarbon gas and oxygen to produce carbon dioxide and gaseous water;
- a steam reformer reactor connected to receive the first hydrocarbon gas from the hydrocarbon gas source, the gaseous water from the phase change reactor, and the carbon dioxide and gaseous water from the combustion chamber, the steam reformer converting the first hydrocarbon gas into carbon monoxide and hydrogen;
- a water gas shift (WGS) reactor connected to the steam reformer reactor to receive carbon monoxide, carbon dioxide and hydrogen into synthesis gas, a carbon dioxide by-product and gaseous water by-product, the carbon dioxide by-product is returned to the WGS reactor for further reaction, and the gaseous water by-product is returned to the steam reformer reactor; and
- an external source of additional carbon dioxide connected to the water gas shift (WGS) reactor to transfer the additional carbon dioxide from the external source to the water gas shift (WGS) reactor.

In a further embodiment of the invention, the synthesis gas production system is a net carbon dioxide absorber.

In a further embodiment of the invention, the synthesis gas production system is a net work producing system, and the work produced can be converted into electrical energy.

In a preferred embodiment of the invention, the first hydrocarbon and the second hydrocarbon are from the same source.

In a further embodiment of the invention, the first hydrocarbon and the second hydrocarbon are selected from the group: methane, natural gas, a methane containing gas, or any combination hereof.

In a further embodiment of the invention, the first hydrocarbon and the second hydrocarbon are from the same source.

In a further embodiment of the invention, the synthesis gas production system is a produces a synthesis gas having a hydrogen to carbon monoxide ratio of 2:1.

In a further embodiment of the invention pressure turbines situated after the WGS reactor to convert work into electrical energy.

In a preferred embodiment of the invention, a separator is used to separate the synthesis gas from the carbon dioxide by-product and gaseous water by-product and, preferably, to separate the carbon dioxide by-product from the gaseous water by-product.

In a further embodiment of the invention, the temperature of the WGS reactor is between 500° C. and 1000° C. and, preferably, between 680° C. and 720° C.

In a further embodiment of the invention, the WGS reactor causes a reaction to occur which reaction operates at an equilibrium of at least 0.26%.

According to a second aspect of the invention a method for the production of synthesis gas is provided wherein the method comprises the steps of:
    feeding reactants into a steam reformation process, wherein the reformation process comprises the steps of:
        a phase change of liquid water to gaseous water;
        steam reformation of a first hydrocarbon gas; and
        a combustion of a second hydrocarbon gas;
    transferring heat, work and product resulting from the reformation process to a Water Gas Shift (WGS) reactor to complete a WGS reaction to produce the synthesis gas, gaseous water by-product and carbon dioxide by-product;
    returning the carbon dioxide by-product to the WGS reactor for further reaction; and
    returning the gaseous water by-product to the reformation process.

In a further embodiment of the second aspect of the invention, gaseous water by-product is returned to the reformation process for further reaction.

DETAILED DESCRIPTION OF DRAWINGS

Figure 1:
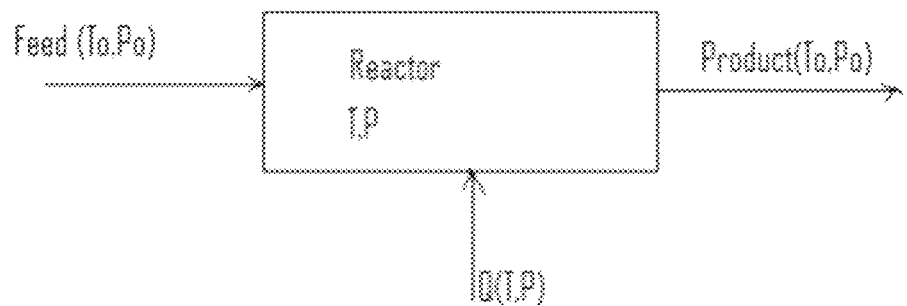
FIG. 1 shows a simple system where the feeds enter and products leave the system at ambient conditions and further shows one place in the system operating at temperature T.
Figure 2:
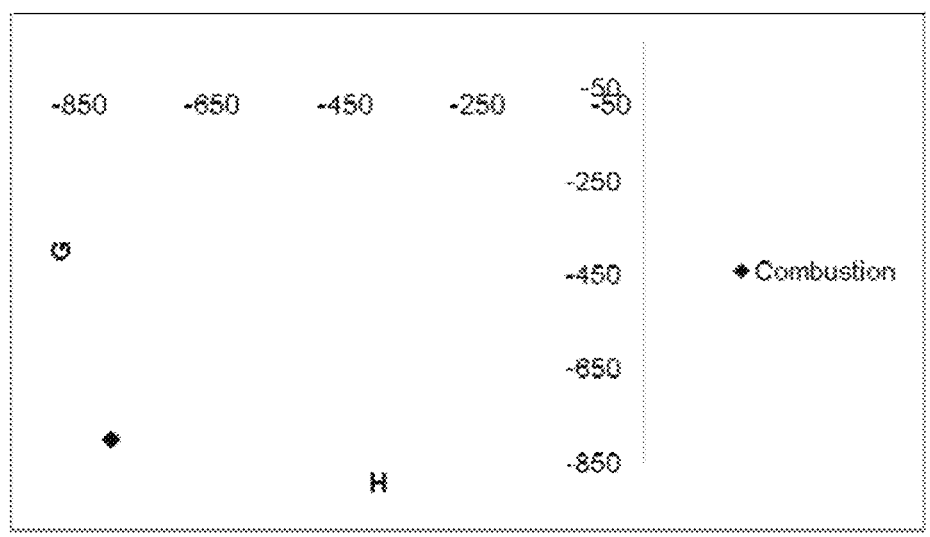
FIG. 2 shows a plot of $\Delta H$ and $\Delta G$ for a methane combustion reaction in a conventional steam reformation process.
Figure 3:
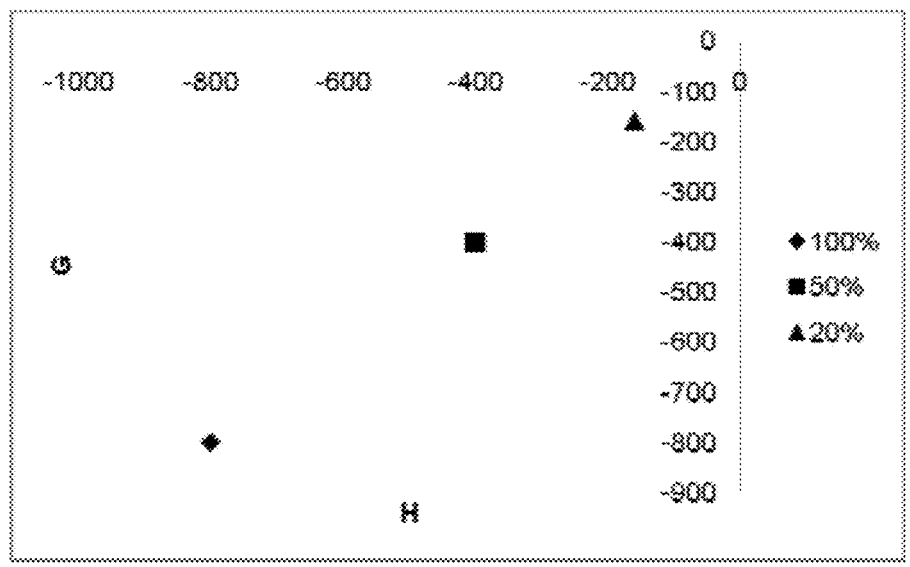
FIG. 3 shows a plot showing the effect of the extent of the reaction for a methane combustion reaction in a conventional steam reformation process.
Figure 4:
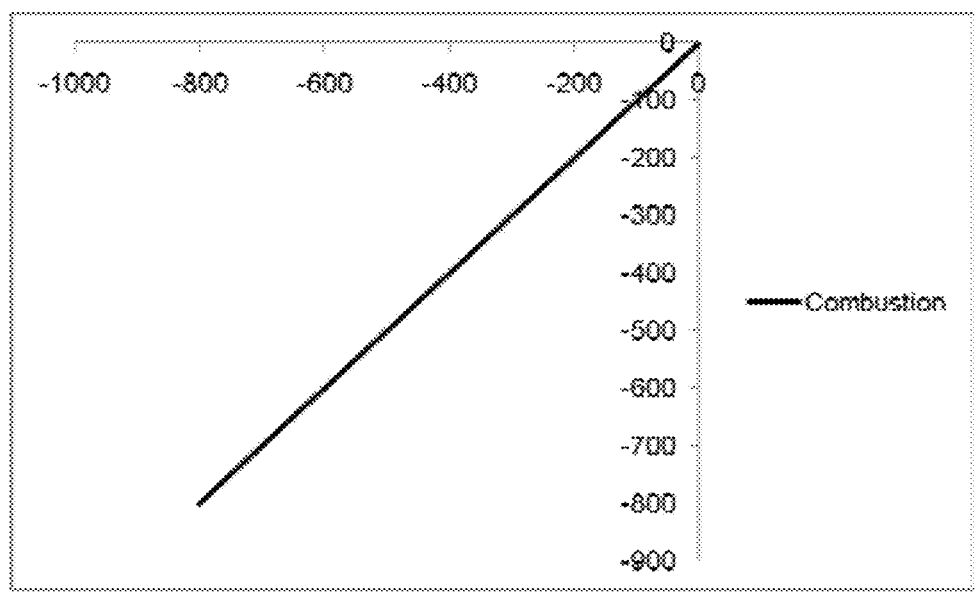
FIG. 4 shows a plot of all the extents of the reaction up to 100% for a methane combustion reaction in a conventional steam reformation process.
Figure 5:
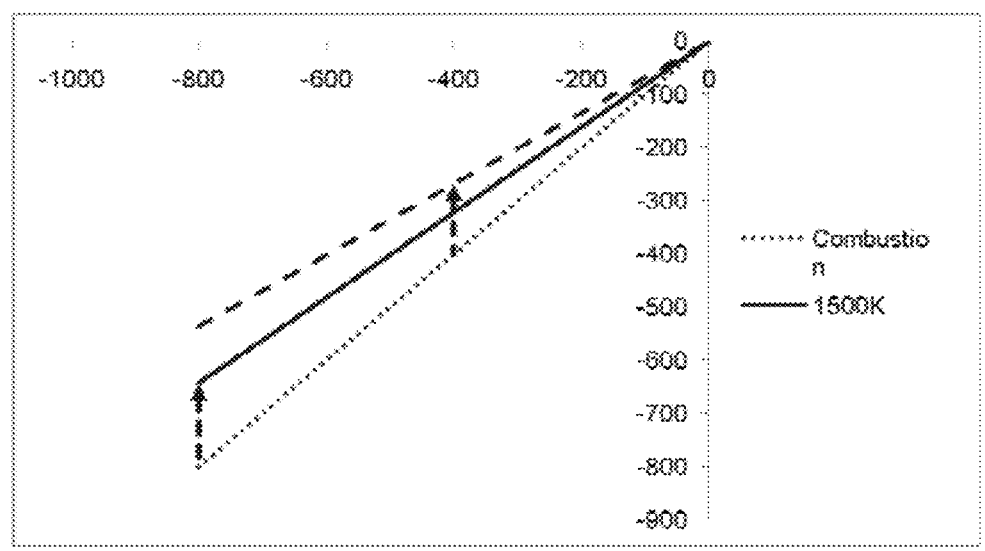
FIG. 5 shows the effect of temperature on the plot of $\Delta H$ and $\Delta G$ for a methane combustion reaction in a conventional steam reformation process.
Figure 6:
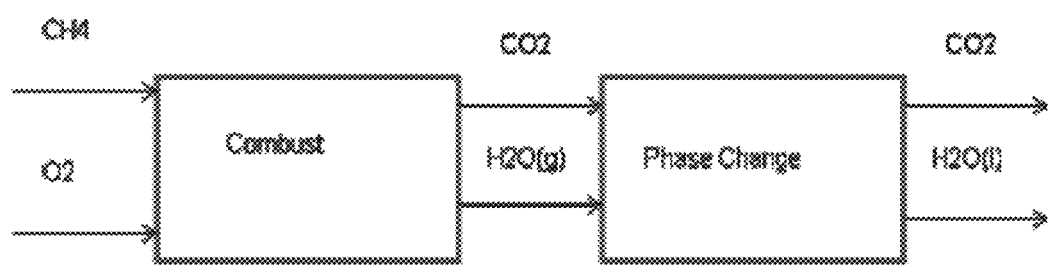
FIG. 6 shows a flow sheet of a hypothetical system combusting methane to form carbon dioxide.

Applying the graphical technique and equations described in the background of the invention to the chemical reactions occurring in a conventional steam reformation process, the following is seen to be true:

1.1. Defining the System

The abovementioned graphical technique was applied to a steam reformation process to produce synthesis gas.

The steam reforming reaction being given by:

$$CH_4(g) + H_2O(g) \rightarrow CO(g) + 3H_2(g)$$

1.2. Calculating the Heat and Work Required by the System

Equations 1 and 2 are then applied to the reforming reaction and the heat and work requirements can be calculated as being:

| | |
|---|---|
| $H_{reforming}$ | 206.12 kJ/mol |
| $G_{reforming}$ | 142.16 kJ/mol |

It is therefore evident that the reforming reaction requires heat and work addition for the reaction to happen. Furthermore, the reforming reaction requires gas phase water (steam) as a feed. Liquid water is the phase that is more readily available. This means that steam is needed to be generated, which can be represented by a Phase Change reaction:

$$H_2O(l) \rightarrow H_2O(g)$$

Applying Equations 1 and 2:

| | |
|---|---|
| $H_{Phase}$ | 44.01 kJ/mol |
| $G_{Phase}$ | 8.56 kJ/mol |

The phase change therefore is also endothermic and requires input of heat and work to occur.

While the reforming reaction produces hydrogen and carbon monoxide in a 3:1 ratio, the more commonly used ratio is 2:1. The ratio is changed is made possible by the Water-Gas Shift reaction (WGS):

$$CO_2(g) + H_2(g) \leftrightarrow CO(g) + H_2O(g)$$

Again applying Equations 1 and 2:

| | |
|---|---|
| $H_{WGS}$ | 41.19 kJ/mol |
| $G_{WGS}$ | 28.59 kJ/mol |

The WGS reaction is an equilibrium reaction and, for the forward direction, as written above, the WGS reaction also requires heat and work addition.

Therefore, in a reformation reaction, there are three reactions that all require the addition of heat and work. If these requirements are not met the steam reforming process will not happen at all.

To meet the requirements a fourth reaction is needed, the combustion reaction:

$$CH_4(g) + 2O_2(g) \rightarrow CO_2(g) + 2H_2O(g)$$

As already shown in the background of the invention section:

| | |
|---|---|
| $H_{combustion}$ | −802.35 kJ/mol |
| $G_{combustion}$ | −800.71 kJ/mol |

A quick look at the $\Delta H$ and $\Delta G$ of the 4 reactions shows that the combustion reaction provides a great deal more heat and work than is actually needed by the other 3 reactions put together. It would be wasteful to provide too much heat and work. The combustion reaction will need to be controlled so as to provide just enough heat and work.

The desired synthesis gas product will have a hydrogen:carbon monoxide ratio of 2:1. The WGS reaction will need to be controlled to meet this specification.

The phase reaction will need to be controlled to provide just enough steam for the reforming reaction. Further, the steam produced by combustion can be used for reforming. So the phase reaction can be used to make up the deficit (if there is one).

1.3. Representing the Required Heat and Work Graphically on a Change of Enthalpy Versus Change in Gibbs Free-Energy Graph The four reactions that are being considered in the design of the reforming flow sheet have been defined as Reforming, WGS, Phase Change and Combustion.

It is also desired to produce the synthesis gas in a Hydrogen:Carbon Monoxide ratio of 2:1.

With this information it is now possible to perform a mass balance in accordance with the desired net effect.

To begin, the Reforming and Combustion reaction both use methane as their feedstock. Therefore, if 1 mole of methane is fed into the system the Reforming and Combustion reactions must now share the same 1 mole of methane. In other words:

$$e_{reform} + e_{combust} = 1$$

where:

e is the extent of reaction

In order in obtain the desired 2:1 synthesis gas ratio a mass balance in hydrogen and carbon monoxide must be performed, as follows:

$$H_2 = 2CO$$

As this is the desired product ratio. This can thus be reworked in terms of the extent of reaction to provide the following:

$$(3e_{reform} - e_{WGS}) = 2(e_{reform} + e_{WGS})$$

or $$e_{WGS} = \frac{1}{3} e_{reform}$$

This illustrates that the most important result of the mass balance above is that for a 2:1 ratio of hydrogen to carbon monoxide the extent of the WGS reaction must always be ⅓ the extent of the reforming reaction.

Finally a similar mass balance can be performed on the Phase Change reaction, resulting in the following equation:

$$e_{phase} = e_{reform} - 2e_{combust} - e_{WGS}$$

From this it is clear that the amount of additional steam that will need to be produced is given by the extent of the reforming reaction (which uses steam as a feed) less the extents of the Combustion and WGS reactions that produce steam (which can be supplied to the reforming reaction).

This allows any extent for the Reforming reaction to be chosen and the other reaction extents will have values determined by the mass balance that gives a synthesis gas product of the desired 2:1 specification.

The mass balances of all the reactions in terms of the Reforming reaction are given by (the extent of the Reforming reaction itself is a degree of freedom):

$$e_{combust} = 1 - e_{reform}$$

$$e_{WGS} = \frac{1}{3} e_{reform}$$

$$e_{phase} = \frac{8}{3} e_{reform} - 2$$

Now it is possible to select any extent for the Reforming reaction. With this extent selected the mass balance for the entire system can be determined and the $\Delta H$ and $\Delta G$ for the system can be determined using the methods previously discussed.

By selecting all the extents of reaction for the Reforming reaction between 0 and 1 it is possible to draw onto the $\Delta H$–$\Delta G$ plot all the possible $\Delta H$ and $\Delta G$ values for all the possible mass balances. Plots of such results can be seen in FIG. 7.

Figure 7:
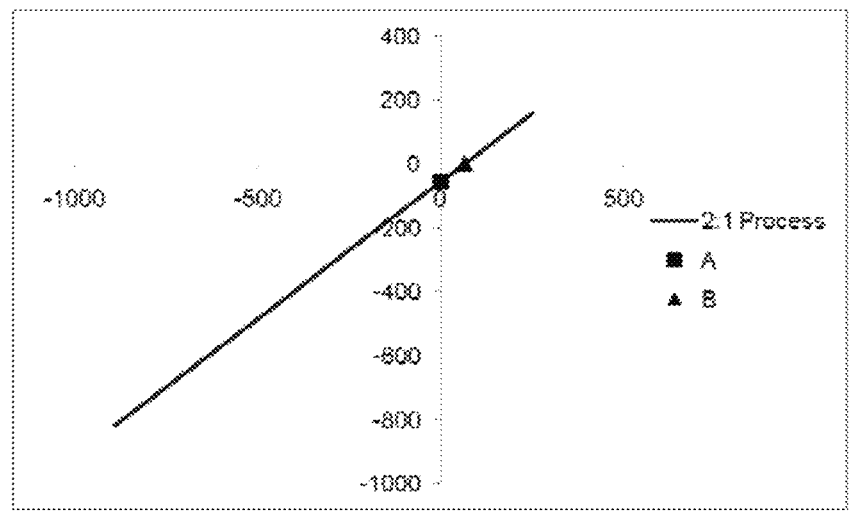
FIG. 7 shows a plots of the results for $\Delta H$–$\Delta G$ for a Reforming reaction extents of reaction for the Reforming reaction for all the possible mass balances between 0 and 1.

The line in FIG. 7 shows all the possible extents of reaction that could produce a synthesis gas product that meets the desired specifications. A system could potentially be designed to operate at any point on the line.

However, it is desirable to rather operate in either the third or fourth quadrant, as these quadrants are either indicative of a net exothermic system or a net work producing system.

In referring to FIG. 7, choosing to operate at any point below point A (into the negative $\Delta H$ and $\Delta G$ quadrant) would result in a system that produces both heat and work. In theory such a system would be functional but is also not the best option. This indicates a system that is producing too much heat and work. As already stated, the only source of heat and work is the Combustion reaction. If there is too much heat and work being produced then it means that the extent of the Combustion reaction is too high. Operating at such points is wasteful in terms of energy and results in the formation of an unnecessary excess of Carbon Dioxide.

This leads to the conclusion that the best point to operate the system at is at point A itself. At this point the system produces work but no heat.

In other words, the best operating point for the system is an adiabatic system.

Figure 8:
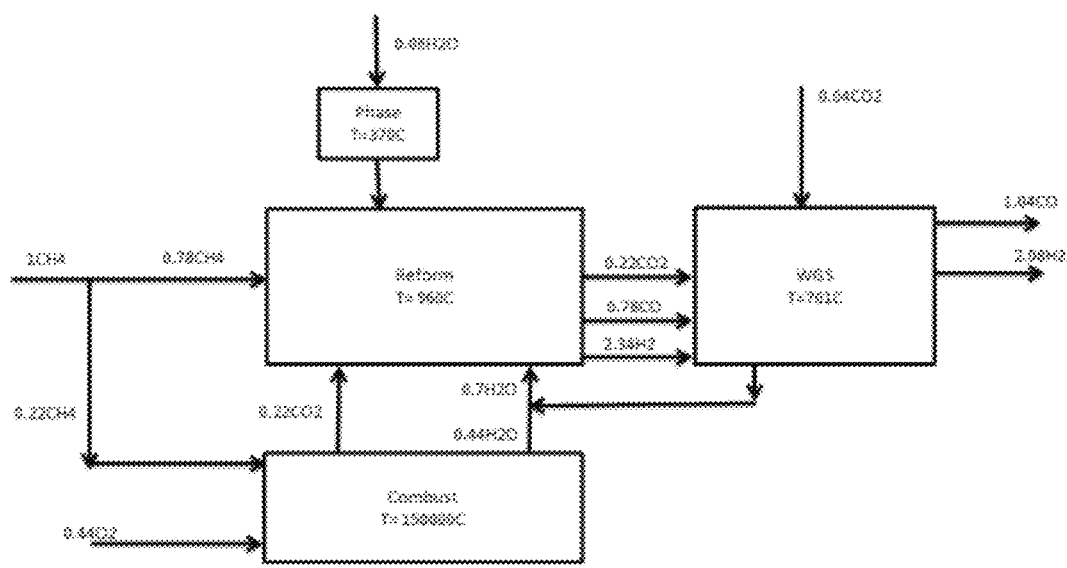
FIG. 8: shows a Reformer flow sheet that has each of the four reactions in their own reaction at their Carnot Temperatures, where the work is carried with the heat, and at atmospheric pressure.

Thus choosing the extent of the Reforming reaction such that the system will be overall adiabatic it is possible to determine the system mass balance and draw a preliminary flow sheet, as is shown in FIG. 8.

FIG. 8 shows a Reformer flow sheet that has each of the four reactions in their own reaction at their Carnot Temperatures (hypothetically, at least), where the work is carried with the heat, and at atmospheric pressure.

This system is adiabatic and produces pure components, excess work and has a Carbon Efficiency of 104%.

It is immediately clear, by briefly examining FIG. 8, that the Carnot Temperature for the Combustion reaction is not feasible. It is also not a realistic solution to consider the production of pure components.

Additionally, the excess work produced by the system needs to be recovered as real work. If it is not done this work will be lost, leading to irreversibility.

Note also that the WGS reaction, defined earlier to be an equilibrium reaction, has not been treated as such in FIG. 8.

This leaves four issues that need to be resolved before a more complete flow sheet can be designed (and before any attempt at simulation can be made). These issues will be dealt with in the following order below: WGS Equilibrium and Operating Temperature; Pure Component Production and Work Recovery.

1.4. WGS Equilibrium and Operating Temperature

It was seen in FIG. 8 above that the Carnot Temperature of the Combustion reaction would not make a practical operating temperature. It is necessary to make modification to the temperatures.

Figure 12:
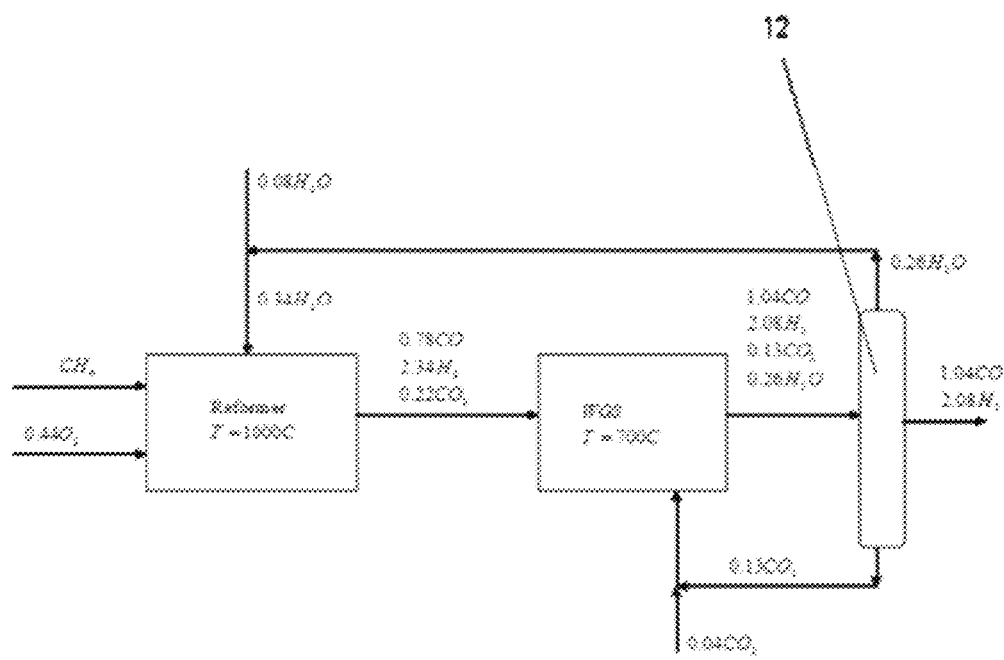
FIG. 12: shows the flow sheet where all the mixing and separation terms have been taken into account and, as in all the previous flow sheets, this system is still overall adiabatic and carbon dioxide consuming.

The system depicted in FIG. 8 produces work that is around 56 kJ/mol. In FIG. 12 it can be seen that changing the operating temperature only has an effect on the $\Delta G$ of the system. This means that changes in temperature will only affect the amount of work the overall system will produce/require.

In order to ensure the Reforming reaction goes essentially to completion (no methane leaving the Reforming reactor) it is necessary to ensure the Reforming reaction is above about 800° C.

It will be shown later that the chosen operating temperature can be treated as a degree of freedom. To avoid any issues of un-reacted methane, consider the temperature of the Reforming Reaction to be 1000° C.

1000° C. is also a reasonable temperature at which to perform the combustion reaction. FIG. 8 also shows the Phase reactor feeds into the Reforming reactor. So it would be a practical idea to perform the formation of steam also at 1000° C.

The temperature change does not affect the mass balance shown in FIG. 8. So the proportions of the reactions required to produce an overall adiabatic system is unchanged. What will change is the amount of work that can be produced by the system.

$\Delta G$ can now be recalculated for the three reactions, using Equation 4.

Before the flow sheet can be redrawn an operating temperature must be selected for the WGS reactor.

This will be done by considering the equilibrium of the WGS reaction.

From the previous analysis that led to FIG. 8, the desired extent of the WGS reaction is known. It is the extent that will be part of making the system overall adiabatic and produced synthesis gas in the desired ratio. Knowing that extent, it is possible to determine an operating temperature that will create an equilibrium that will provide that extent.

The equilibrium constant is given by the well known equation:

$$K = \frac{\text{products}}{\text{reactants}} = \frac{(CO)(H_2O)}{(H_2)(CO_2)} = 2\frac{H_2O}{CO_2} \tag{8}$$

Recalling that the desired hydrogen:carbon monoxide ratio is 2:1, equation 8 can easily be written in terms of the mass balance around the WGS reaction of FIG. 8. Alternatively it is also a trivial matter to write equation 8 in terms of the extent of the Reform reaction, using the mass balance method shown above.

Additionally, the Equilibrium constant is given in terms of temperature by:

$$\frac{d\ln K}{dT} = \frac{\Delta H_{rxn}^0}{RT^2} \tag{9}$$

Where:
$\Delta H_{rxn}^0$ is the Enthalpy of the WGS reaction as calculated by equation 1
R is the gas constant
T is temperature
K is the equilibrium constant So the equilibrium is given in terms of the mass balance and the temperature. By equating Equations 8 and 9 appropriately it can be shown that for a certain extent of reaction the required temperature can be determined, or for a given temperature the equilibrium extent can be determined.

Figure 9:
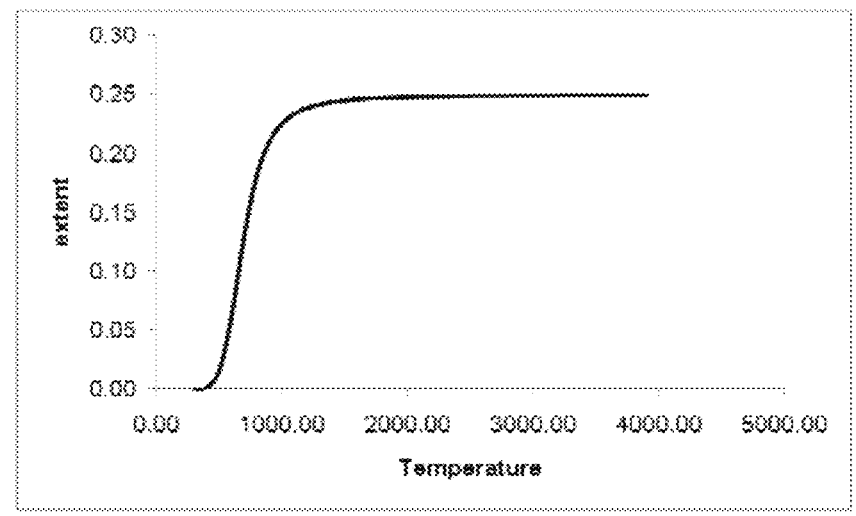
FIG. 9: shows the equilibrium extent and temperature for a WGS reaction.

This can be drawn onto a graph of extent against temperature, as is shown in FIG. 9.

FIG. 9 shows that the extent of the WGS reaction asymptotes at 0.25. In other words, no matter how high the temperature is made the extent of the WGS equilibrium can never exceed 25%.

Looking at FIG. 8 however it can be seen that the extent of the WGS reaction needs to be 0.26. According to FIG. 9 it is impossible to get that extent.

It should be noted that this equilibrium calculation was carried out using only the quantities shown in FIG. 8. It can be shown using Le Chateliers principle that by adding more carbon dioxide than what is shown in FIG. 9 the equilibrium can be pushed even further towards the products (thereby increasing the extent of the WGS reaction).

This means there is an additional degree of freedom. The more additional carbon dioxide added, the lower the necessary reaction temperature will be.

If the additional carbon dioxide added is defined as a quantity X then Equation 8 will become:

$$K = 2\frac{H_2O}{(X + CO_2)}$$

As mentioned earlier, the ideal operating temperature would be the Carnot temperature. The Carnot Temperature is shown to be 701° C. (974K) in FIG. 9. So the desired temperature and the required extent is known, thus the amount of additional Carbon Dioxide (X) can be calculated.

Figure 10:
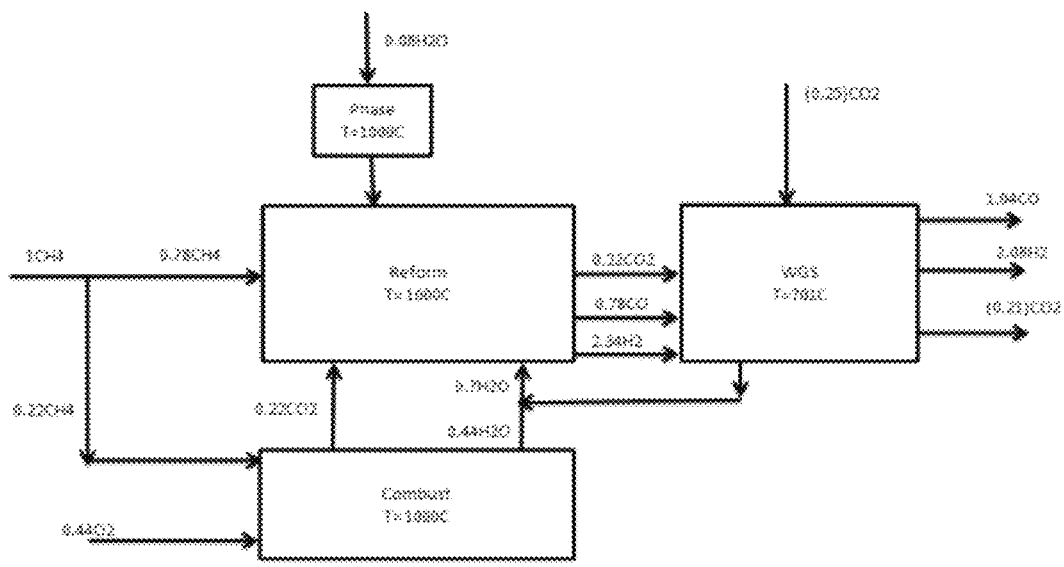
FIG. 10: shows a flow sheet according to the invention at a modified temperature.

After modifying the reaction temperatures and considering the equilibrium of the WGS reaction, the flow sheet can now be expressed as is shown in FIG. 10.

FIG. 10 shows the flow sheet modified for more reasonable temperatures. This system is still overall adiabatic, is a net consumer of carbon dioxide and produces work at approximately 2 kJ/mol.

FIG. 10 is not the most efficient way to draw the flow sheet. Seeing as the Reform, Combust and Phase reactions all operate at the same temperature, it is more convenient to put these 3 reactions into a single unit and call it the Reformer. Additionally notice that the WGS reactor is emitting less carbon dioxide then is being fed into it. It would be preferable, perhaps, to reuse the carbon dioxide that is being vented and make up the carbon dioxide that was consumed in the WGS reaction with a fresh carbon dioxide flow.

Figure 11:
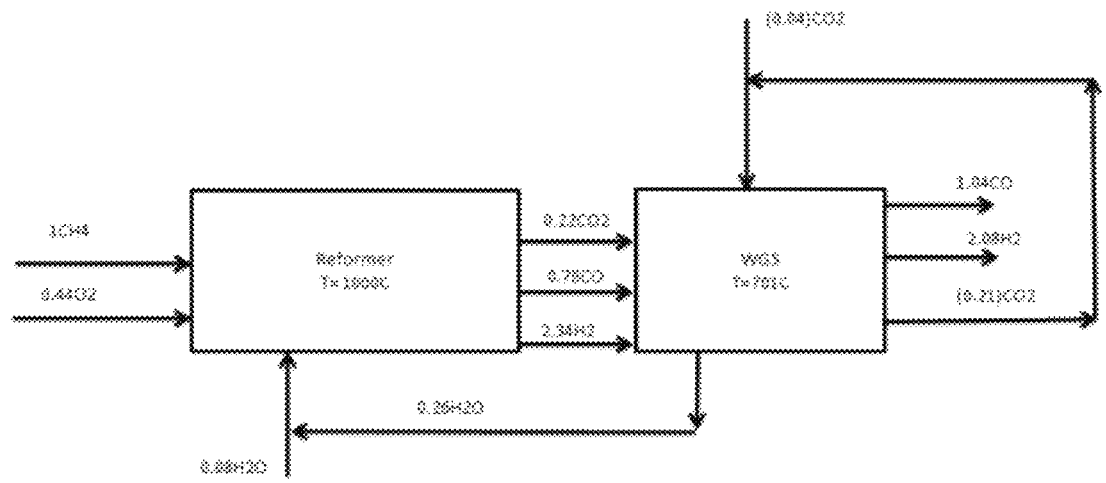
FIG. 11: is a reproduction of FIG. 10 but with the carbon dioxide recycle added and the Reform, Combust and Phase reactions combined into a single unit.

Making these changes results in the flow sheet FIG. 11.

FIG. 11 is a reproduction of FIG. 10 but with the carbon dioxide recycle added and the Reform, Combust and Phase reactions combined into a single unit. This system is still adiabatic, work producing and carbon dioxide absorbing.

1.5. Pure Components

Thus far the effect of operating temperature on the flow sheet has been considered. It is the reality that the streams leaving the two reactors will be as mixtures and not as pure components.

There will be two instances of mixing to consider: the mixing of the products leaving the Reformer and those leaving the WGS reactor.

This mixing can be handled as a vector with magnitude defined by equation 7. The direction of this mixing vector will always be vertical, since there is no Enthalpy of mixing in the case of ideal mixing. The vector will point vertically in a negative direction (downwards) since mixing is the opposite of separation. Separation has a positive (upwards) direction since separation always requires work.

Similarly, it can be seen that in order to have the carbon dioxide and water recycles depicted in FIG. 11 it will be necessary to separate the mixture leaving the WGS reactor into separate streams of water, carbon monoxide and the product mixture of synthesis gas.

Like the case of modifying temperature, the mixing/separation terms have no effect on the proportion of the reactions needed to create an overall adiabatic system. So the mass balance remains unchanged, what will change is the amount of work that the system will produce.

Performing the vector additions result in a flow sheet as depicted in FIG. 12.

FIG. 12 shows the flow sheet where all the mixing and separation terms have been taken into account. As in all the previous flow sheets this system is still overall adiabatic and carbon dioxide consuming. What has changed for FIG. 12 is that the amount of work that the system now produces is approximately 14 kJ/mol.

1.6. Work Recovery

For all the flow sheets thus far it has been shown that they all produce work of varying amounts depending on what the operating temperatures are and whether mixing and separation is being considered.

This excess work is being released from the system. It needs to be recovered in some way or that work will simply be lost to the environment where it will facilitate unfavorable reactions in the environment.

The best way to recover this work would be with shaft work which, in the case of generators, would be witnessed as electricity.

Thus far, no consideration has been given to pressure as a means of removing work from the system.

The calculations leading to FIG. 12 revealed how much work would need to be recovered from the system. The mass balance for the system has also been well defined. That means Equation 6 can be used to determine the only remaining unknown quantity, the Pressure.

Using Equation 6 it can be found that a pressure of 7.2 atmospheres would allow the recovery of the excess work for the system depicted in FIG. 12.

Figure 13:
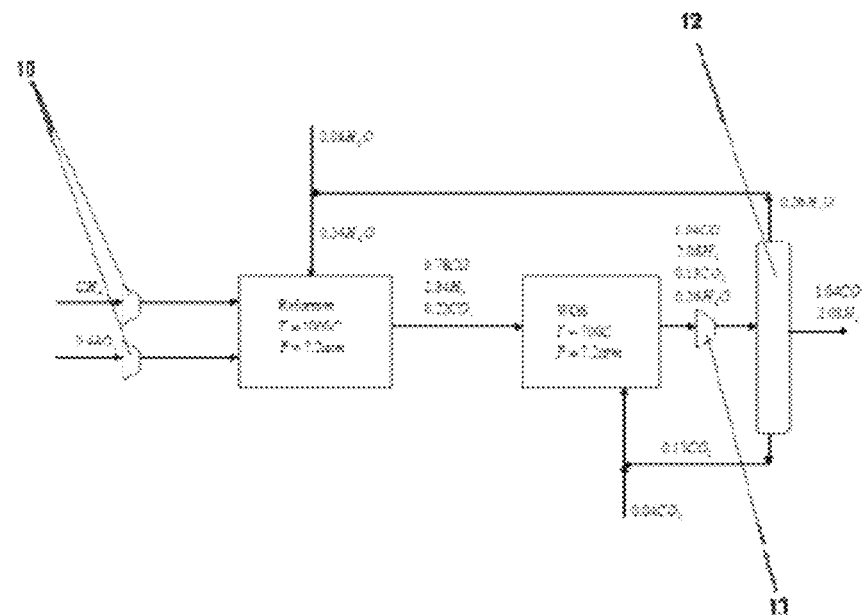
FIG. 13: shows a complete flow sheet according to the invention showing a system that is overall adiabatic, has a carbon efficiency of 104% and generates electricity at the reasonable pressure of 7.2 atmospheres.

This allows a final flow sheet, as depicted in FIG. 13, to be drawn:

The system, according to FIG. 13, shows a system that is overall adiabatic, has a carbon efficiency of 104% and generates electricity at the reasonable pressure of 7.2 atmospheres.

In FIG. 13, a turbine (10) can be placed either before the separator (12) (as it has been in FIG. 13), or two separate turbines can be placed after the separator (12), one turbine (10) on the synthesis gas product stream and another on the carbon dioxide stream leaving the separator (12).

This choice depends on factors such as the cost difference of fitting one turbine (10) or two and whether the separation can be performed easier a low or high pressure. The quantity of work recovered, in total, will remain unchanged regardless of the turbine (10) placement.

With FIG. 13 it is possible to illustrate how the heat and work flows within the system. This can be seen in FIG. 14.

Figure 14:
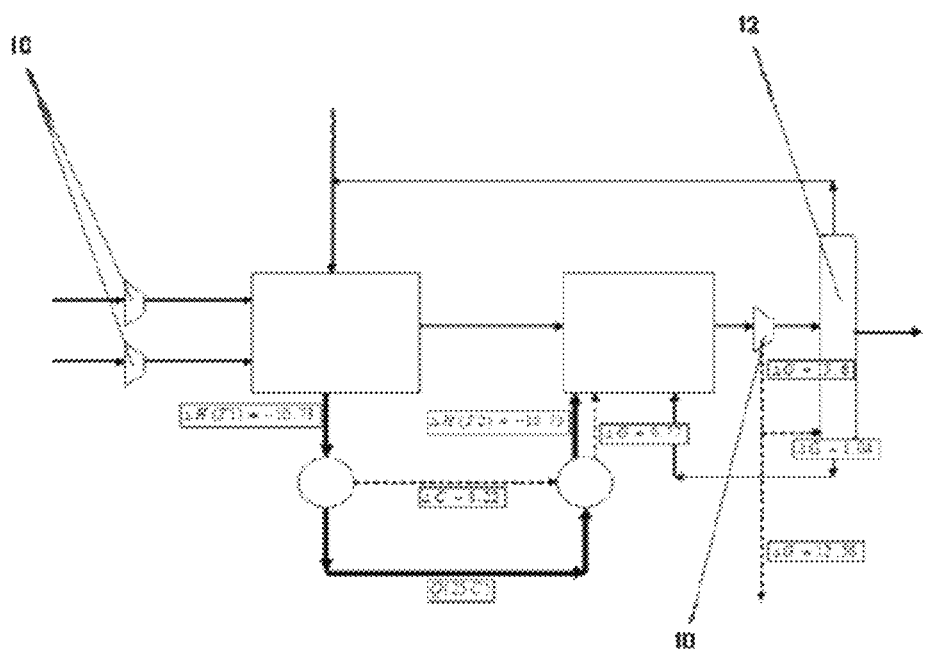
FIG. 14: is a schematic of the flow of heat and work according to the invention.

FIG. 14 is identical in mass flow to FIG. 13. FIG. 14 instead shows the flow of heat and work within the system. Heat is the thick lines and work is dashed lines.

As can be seen, the first reactor (Reforming and combustion) is exothermic. The heat leaving the Reformer carries work with it, by virtue of its temperature. This heat is transferred to the endothermic WGS reactor but at a different temperature. This means that the work available from the Reformer heat is more than the work required by the WGS reactor, which means there is an excess. This excess, along with the additional work from mixing, is recovered by the use of pressure to generate electricity in a turbine (10).

In conclusion, the purposed system provides a means for the formation of a synthesis gas by way of steam reformation with the system being a net carbon dioxide absorber and work generator.

What is claimed is:

1. A method for the production of synthesis gas, wherein the method comprises the steps of:
    feeding reactants into a reformation process, wherein the reformation process comprises the steps of:
      a phase change of liquid water to gaseous water;
      a combustion of a first hydrocarbon gas to produce carbon dioxide and gaseous water; and
      steam reformation of a second hydrocarbon gas, wherein the second hydrocarbon gas is mixed together with the carbon dioxide and gaseous water from the combustion step;
    transferring heat, and product resulting from the reformation process to a Reverse Water Gas Shift (RWGS) reactor to complete a RWGS reaction to produce the synthesis gas, gaseous water and carbon dioxide by-product;
    returning the carbon dioxide to the RWGS reactor for further reaction; and
    returning the gaseous water to the reformation process.

2. The method, according to claim 1, wherein the reformation process includes the following reactions:

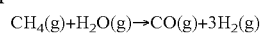

$$CH_4(g)+H_2O(g) \rightarrow CO(g)+3H_2(g)$$

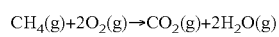

$$CH_4(g)+2O_2(g) \rightarrow CO_2(g)+2H_2O(g)$$

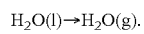

$$H_2O(l) \rightarrow H_2O(g).$$

3. The method, according to claim 1, wherein the RWGS reaction step includes the following equilibrium reaction:

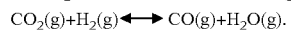

$$CO_2(g)+H_2(g) \leftrightarrow CO(g)+H_2O(g).$$

4. The method, according to claim 1, comprising a further step of adding additional carbon dioxide from an external source to the reverse water gas shift (RWGS) reactor.

\* \* \* \* \*

UNITED STATES PATENT AND TRADEMARK OFFICE
CERTIFICATE OF CORRECTION

| | | |
|---|---|---|
| PATENT NO. | : 8,940,188 B2 | Page 1 of 1 |
| APPLICATION NO. | : 13/322774 | |
| DATED | : January 27, 2015 | |
| INVENTOR(S) | : James Alistair Fox et al. | |

It is certified that error appears in the above-identified patent and that said Letters Patent is hereby corrected as shown below:

In the Claims

In Column 14, Line 48 (Claim 1, line 15), delete "by-product"

Signed and Sealed this
Fifteenth Day of September, 2015

Michelle K. Lee
*Director of the United States Patent and Trademark Office*